United States Patent [19]

Sakano

[11] Patent Number: 4,603,286
[45] Date of Patent: Jul. 29, 1986

[54] ACCELERATION/DECELERATION CONTROL SYSTEM

[75] Inventor: Tetsuro Sakano, Hachiouji, Japan

[73] Assignee: Fanuc Ltd, Hino, Japan

[21] Appl. No.: 674,962

[22] PCT Filed: Feb. 27, 1984

[86] PCT No.: PCT/JP84/00068
§ 371 Date: Nov. 15, 1984
§ 102(e) Date: Nov. 15, 1984

[87] PCT Pub. No.: WO84/03779
PCT Pub. Date: Sep. 27, 1984

[30] Foreign Application Priority Data

Mar. 16, 1983 [JP] Japan .................................. 58-42309

[51] Int. Cl.$^4$ .............................................. G05B 5/01
[52] U.S. Cl. ...................................... 318/615; 318/572
[58] Field of Search ............... 318/615, 572, 568, 569, 318/571, 617, 621; 328/167

[56] References Cited

U.S. PATENT DOCUMENTS 4,422,150 12/1983 Keller et al. ......................... 364/475
4,437,067  3/1984 McKenzie et al. .................. 328/167

Primary Examiner—William M. Shoop, Jr.
Assistant Examiner—Saul M. Bergmann
Attorney, Agent, or Firm—Staas & Halsey

[57] ABSTRACT

In an acceleration/deceleration control system of a servo motor, an acceleration/deceleration control section (5) has a low-pass filter (4) of second or higher order when an exponential acceleration/deceleration system is used, and the acceleration/deceleration section (5) has a linear acceleration/deceleration section (3) and the low-pass filter (4) of second or higher order connected to the output of the linear acceleration/deceleration section (3) when a linear acceleration/deceleration system is used. A position instruction (Pa) is filtered through the low-pass filter (4) of second or higher order, and a filtered signal is supplied to a servo control section (6), thereby driving the servo motor (M).

7 Claims, 11 Drawing Figures

ACCELERATION/DECELERATION CONTROL SYSTEM

CROSS REFERENCE TO RELATED APPLICATIONS

This application is related to copending U.S. patent application having U.S. Ser. No. 471,474 now U.S. Pat. No. 4,555,758.

BACKGROUND OF THE INVENTION

The present invention relates to an acceleration/deceleration control system of a servo motor used in a numerical control (NC) machine tool and a robot.

FIG. 1 is a block diagram of a servo motor acceleration/deceleration control system. A typical example of the conventional acceleration/deceleration system of this type is an exponential acceleration/deceleration control system.

In this system, an exponential function type acceleration/deceleration control unit is used as an acceleration/deceleration control section 1 shown in FIG. 1. When a position instruction is supplied as a displacement $V_0$ per unit time to the acceleration/deceleration section 1, i.e., when a pulsed input shown in FIG. 2(a) is entered as a value $V_0$ which is substantially the same as the velocity, an exponential output shown in FIG. 2(b) is obtained.

As shown in this response waveform, an acceleration speed is high at a leading edge (indicated by $\alpha$ in FIG. 2) due to the influence of a high-frequency component, so that a servo control section 2 and a load system are subjected to shock, resulting in vibrations. As shown in FIG. 2(b), a long period of time is required to decelerate and stop the servo motor, resulting in inconvenience. For these reasons, for example, when X- and Y-axis servo motors are used to shift a table of a machine tool in an arcuated manner, the table has a locus smaller than that designated by an instruction.

A linear acceleration/deceleration control system can be used in place of the exponential acceleration/deceleration control system. An output waveform shown in FIG. 5(b) is obtained in response to a step input shown in FIG. 5(a). As indicated by this output waveform, an acceleration speed abruptly changes, and a servo control system and a load system are subjected to shock, resulting in vibrations. For example, an arm of a robot or the like continues to vibrate when it is stopped quickly, resulting in inconvenience.

Furthermore, since the servo control system and the load system have natural frequencies, when the servo control system and the load system are driven by frequency components similar to their natural frequencies, respectively, the servo control system and the load system vibrate by themselves. For this reason, vibration of the natural frequency components included in position instruction for the servo control system and the load system must be cut off.

SUMMARY OF THE INVENTION

A transfer function in an exponential acceleration/deceleration control section for generating the output shown in FIG. 2(b) in response to the step input shown in FIG. 2(a) is a transfer function H(S) having a time-lag of first order as follows:

$$H(S) = K/(S+K) \quad (1)$$

where K is a constant.

This transfer function is obtained by a first-order low-pass filter. The conventional acceleration/deceleration control section 1 given by this transfer function indicates that a low-frequency component included in the position instruction (input) passes through but a high-frequency component is cut off, and that the resultant frequency component as the position instruction is supplied to the servo control section 2. However, as indicated by the output waveform shown in FIG. 2(b), the influence of a high-frequency component occurs at the leading edge or the like to cause an abrupt change in velocity. For this reason, in order to cut off the high-frequency component, a time constant of the transfer function given by equation (1) must be increased. However, when the time constant is increased, a response time becomes slow, and a time for stopping the servo motor becomes prolonged.

This can be overcome by using a higher-order low-pass filter in place of the first-order low-pass filter. In this case, the position instruction to the servo motor is filtered through this higher-order low-pass filter, and the servo motor is driven by the filtered component. As the order of the low pass filter is increased, the natural frequencies of the servo control system and the load system can be cut off, and the high-frequency component is also cut off. As a result, a smooth response waveform and a fast response can be obtained.

It is, therefore, a first object of the present invention to provide an acceleration/deceleration control system of a servo motor, wherein a change in velocity can be decreased by using a higher-order low-pass filter, and a short response time can be obtained with a small delay.

It is a second object of the present invention to provide an acceleration/deleration system of a servo motor wherein practically no vibrations occur and the servo motor can be operated with a small change in velocity.

In order to achieve the above objects of the present invention, there is provided an acceleration/deceleration system for controlling acceleration/deceleration of a servo motor by filtering a position instruction to the servo motor through a low-pass filter of second or higher order.

According to the acceleration/deceleration control system for controlling linear acceleration/deceleration, the position instruction supplied to the servo motor is subjected to linear acceleration/deceleration control. The linearly controlled instruction is filtered through a low-pass filter of second or higher order.

As described above, since the position instruction is supplied to the servo motor through the low-pass filter of second or higher order, the high-frequency component is cut off, and the natural frequency components of the servo control system and the load system are also cut off. As a result, the servo control system and the load system will neither be subjected to shock nor generate vibrations. In addition, the servo control system and the load system will not vibrate by themselves. Since a high-order low-pass filter is used, a fast response time can be obtained. For example, unlike the conventional example, a table or the like of a machine tool will not trace a locus smaller than that specified by the instruction even if it is driven in an arcuated locus.

DETAILED DESCRIPTION OF THE PREFERRED EMBODIMENT

The present invention will be described in detail hereinafter.

transfer function H(S) of a higher-order low pass filter can be obtained by using a second-order transfer function, a third-order transfer function as a combination of first- and second-order transfer functions, and a fourth-order transfer function as a combination of second-order transfer functions in the following manner:

2nd-order $H(S) = (A_1W_0)^2/\{S^2 + (A_1W_0/Q_1)S + (A_1W_0)^2\}$ (2)

3rd-order $H(S) = \{(B_1W_0)/(S + B_1W_0)\} \times [(A_1W_0)^2/\{S^2 + (A_1W_0/Q_1)S + (A_1W_0)^2\}]$ (3)

4th-order $H(S) = [(A_1W_0)^2/\{S^2 + (A_1W_0/Q_1)S + (A_1W_0)^2\}] \times [(A_2W_0)^2/\{S^2 + (A_2W_0/Q_2)S + (A_2W_0)^2\}]$ (4)

where $A_1$, $A_2$, $B_1$, $Q_1$ and $Q_2$ are coefficients and $W_0$ is the angular velocity at a cutoff frequency of the filter.

By properly selecting the coefficients (i.e., $A_1$, $B_1$ and $Q_1$) of the transfer functions H(S), a low-pass filter having a high speed and smooth response and free from oscillations can be obtained. This low-pass filter may be any one of Bessel, Butterworth and Chebyshev filters.

Figure 1:
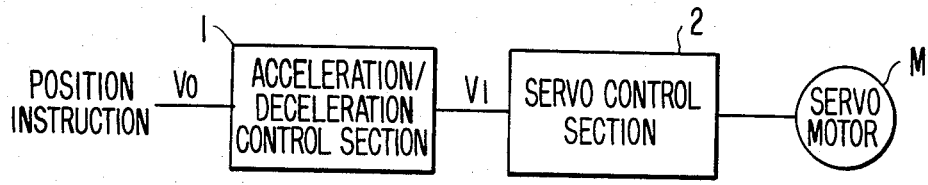
FIG. 1 is a block diagram of an acceleration/deceleration control system of a servo motor.
Figure 2:
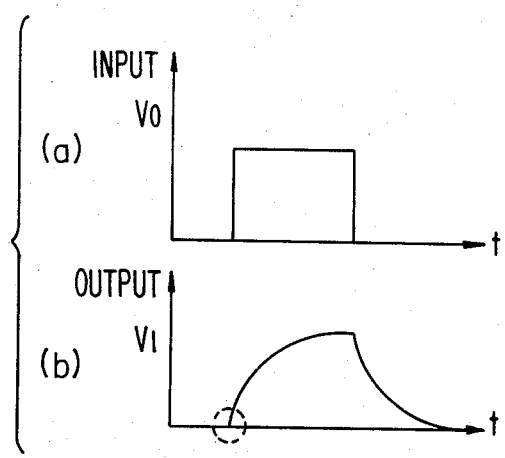
FIG. 2a and 2b illustrates waveforms of an input and an output with respect to a conventional exponential acceleration/deceleration control system.
Figure 3:
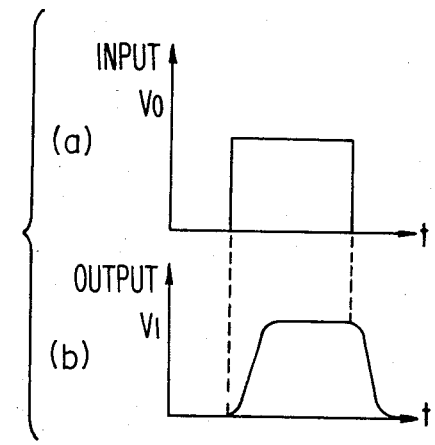
FIGS. 3a and 3b illustrate; input/output waveforms with respect to the acceleration/deceleration control section when a higher-order low-pass filter is used in this section.

An optimal low-pass filter for achieving the above objects of the present invention can be obtained such that the coefficients of the Bessel filter are properly selected, and a cutoff frequency of the filter is selected to cut off the natural frequencies of the servo control system and the load system. This Bessel low-pass filter is used as the acceleration/deceleration control section 1 in FIG. 1. An output shown in FIG. 3(b) is generated from the acceleration/deceleration section 1 in response to the input waveform of the position instruction, as shown in FIG. 3(a). In this manner, the high-frequency component is cut off from the position instruction, so that a change in output $V_1$ is smooth. A high acceleration speed at the leading edge of the output will not be obtained. As a result, the time required for decelerating and stopping the servo motor can be shortened.

Figure 4:
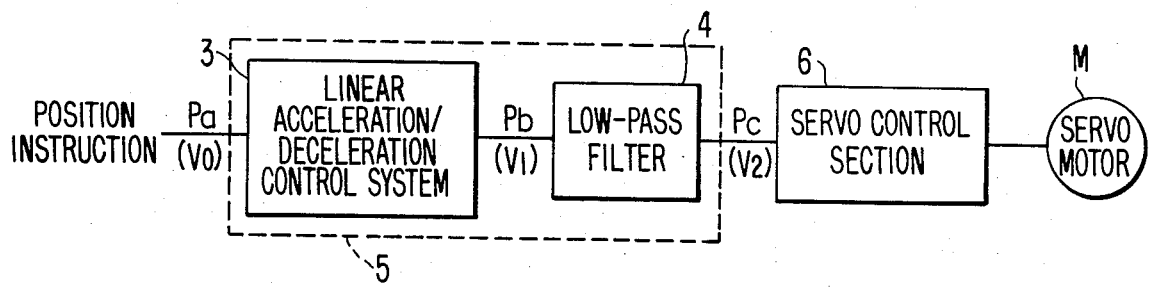
FIG. 4 is a block diagram of an embodiment of the present invention when a higher-order low-pass filter is used.
Figure 5:
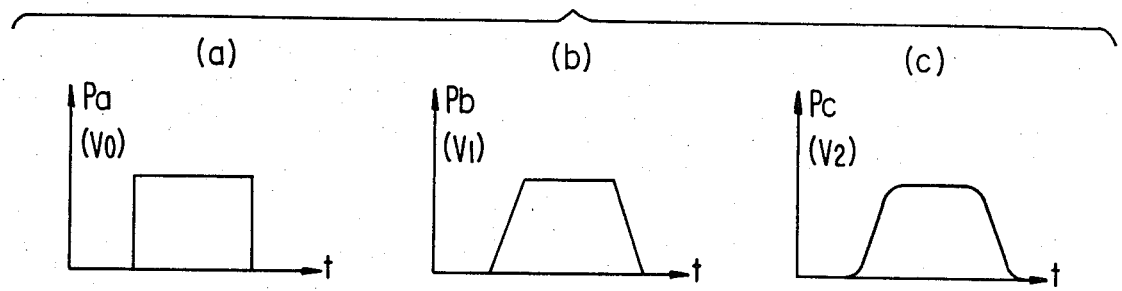
FIG. 5 illustrates input/output waveforms of the respective blocks of the embodiment shown in FIG. 4.

As a second embodiment of the present invention, a high-order low-pass filter 4 is connected to an output of a linear acceleration/deceleration section 3, as shown in FIG. 4. An output from the low-pass filter 4 drives a servo control section 6 and a servo motor M. This output $V_2$ becomes smooth, as shown in FIG. 5(c) More particularly, when a pulsed input $V_0$ shown in FIG. 5(a) is supplied to the linear acceleration/deceleration section 3, the linear acceleration/deceleration section 3 generates an output $V_1$, as shown in FIG. 5(B). In the conventional control system, the output $V_1$ is supplied to the servo control section 6. However, according to the present invention, the output $V_1$ is supplied to the high-order low-pass filter 4 which then generates the output $V_2$ whose waveform is illustrated in FIG. 5(c). The output $V_2$ is then supplied to the servo control section 6. As a result, since the output $V_2$ whose waveform shown in FIG. 5(c) is smoother than that of the output $V_1$ shown in FIG. 5(b) is supplied to the servo control section 6, the servo control section 6 and the servo motor M will not receive shock caused by an abrupt change in velocity and will not generate vibrations. In addition, the servo control section 6 and the servo motor M have a fast response time.

As described above, the low-pass filter is used in the acceleration/deceleration control section according to the present invention. In the linear acceleration/deceleration system, the linear acceleration/deceleration section 3 and the low-pass filter 4 constitute an acceleration/deceleration control section 5. As a result, an acceleration/deceleration control system having a fast response time and being free of vibrations can be obtained.

An embodiment of the present invention which has the acceleration/deceleration control section 5 consisting of the linear acceleration/deceleration section 3 (FIG. 4) and the low-pass filter 4 will be described with reference to the accompanying drawings.

Digital processing of the linear acceleration/deceleration section (FIG. 4) will be described with reference to FIG. 6. A position instruction Pa for each axis is supplied from an interpolation distribution control section or the like to the linear acceleration/deceleration section 3 for each sampling (a sampling period T). The linear acceleration/deceleration section 3 has (n−1) delay units $Z^{-1}$ (delay of the sampling period T) (where n is a value obtained by dividing by the sampling period T and the acceleration/deceleration time τ from the beginning to the end of acceleration or deceleration, i.e., n=τ/T). The position instruction Pa is added by an adding means 10 to the output from each of the delay units $Z^{-1}$. A multiplying means 11 multiplies 1/n with a sum from the adding means 10, thus obtaining Pb as follows:

$Pb = (Pa + X_1 + X_2 + \ldots + X_{n-1})/n$ (5)

Figure 7:
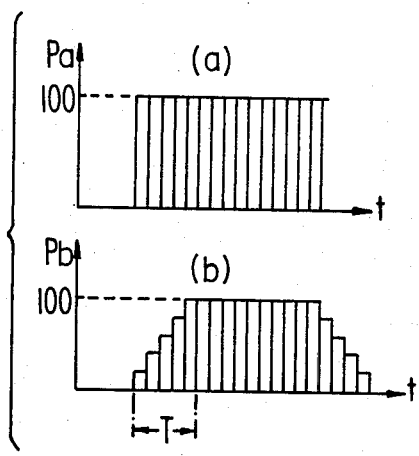
FIGS. 7a and 7b illustrates input/output waveforms with respect to the system shown in FIG. 6.

For example, if the position instruction Pa, the sampling period T and the acceleration/deceleration time are given as 100, 8 msec and 40 msec, respectively, n=40/8=5. The linear acceleration/deceleration section 3 comprises four delay units $Z^{-1}$, and the relationship between the input and the output is shown in FIGS. 7(a) and 7(b). In the first sampling cycle, Pa=100, and $X_1$ to $X_4$=0, therefore, $$Pb = (Pa + X_1 + X_2 + X_3 + X_4)/n$$
$$= 100/5 = 20$$

In the second sampling cycle, $$Pa = 100, X_1 = 100 \text{ and } X_2 \text{ to } X_4 = 0$$

therefore, $$Pb = (100 + 100)/5 = 40$$

Similarly, in the third sampling cycle, Pb=60 is obtained; in the fourth sampling cycle, Pb=80; in the fifth sampling cycle, Pb=100. In this manner, Pb is linearly increased. When the input Pa becomes zero, as shown in FIG. 7(a), the output Pb is also linearly decreased.

The linear acceleration/deceleration section 3 of the (FIG.) is operated as follows.

The high-order digital low-pass filter 4 (FIG. 4) will be described. This filter 4 can be prepared by a combination of the first- and/or second-order elements. The transfer function of the first-order filter is given by equations (1) and (3) in the following manner:

$$H(S) = BW_0/(S + BW_0)$$

This transfer function is Z-transformed to obtain a pulse transfer function as follows:

$$H(Z) = G/(1 - K \cdot Z^{-1})$$

Figure 8:
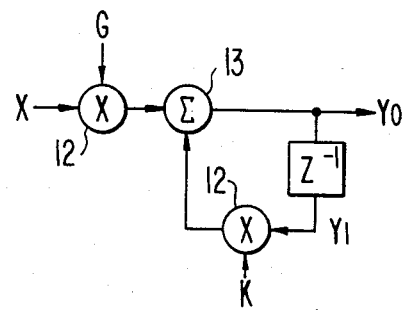
FIG. 8 is a block diagram of a first-order digital filter.

This pulse transfer function is achieved by the circuit shown in FIG. 8.

Referring to FIG. 8, reference numeral 12 denotes a multiplying means; and 13, an adding means. Reference symbol $Z^{-1}$ denotes a delay unit for delaying an input by one sampling period T. Reference symbols K and G are values given as follows:

$$K = e^{-BW_0T}$$

$$G = 1 - K$$

where B is the filter coefficient and $W_0$ is the angular velocity at the cutoff frequency $f_0$ of the filter, i.e., $W_0 = 2\pi f_0$.

When the operation of the circuit shown in FIG. 8 is performed for every sampling period T, a first-order digital filter can be obtained. In other words, the operations are performed as follows to obtain $Y_0$:

$$Y_1 = Y_0 \text{ (}Y_1 \text{ is the immediately preceding}$$
$$\text{sampled value of a sampled value } Y_0\text{)}$$
$$Y_0 = G \cdot X + K \cdot Y_1$$

The sample value $Y_0$ from the first-order filter is an output therefrom.

Similarly, a Z-transformed pulse transfer function of the second-order transfer function H given by equation (2) is derived as follows:

$$H(Z) = G/(1 - K \cdot Z^{-1} - L \cdot Z^{-2})$$

Figure 9:
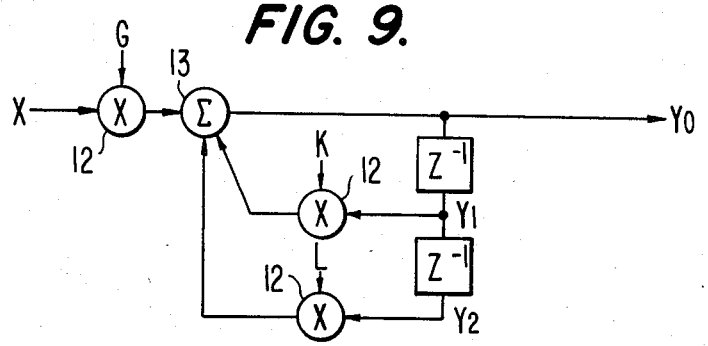
FIG. 9 is a block diagram of a second-order digital filter.

This transfer function is achieved by a circuit shown in FIG. 9. The following operations are performed for every sampling period T so as to obtain an output $Y_0$, thereby obtaining a second-order digital filter.

$$Y_2 = Y_1 \text{ (}Y_2 \text{ is the immediately preceding sampled}$$
$$\text{value of the sampled value } Y_1\text{)}$$
$$Y_1 = Y_0 \text{ (}Y_1 \text{ is the immediately preceding sampled}$$
$$\text{value of the sampled value } Y_0\text{)}$$
$$Y_0 = G \cdot X + K \cdot Y_1 + L \cdot Y_2$$

$$\text{for } K = 2 \cdot e^{-AW_0T/2Q} \cdot \cos(AW_0T\sqrt{4Q^2 - \tfrac{1}{2}Q})$$

$$L = -e^{-AW_0T/Q}$$
$$G = 1 - K - L$$

When the circuits shown in FIGS. 8 and 9 are connected in series in consideration of the orders of the filters, the third- and fourth-order digital low-pass filters given by equations (3) and (4) can be obtained. Additional filters such as shown in FIGS. 8 or 9 can be selectively connected to obtain a higher order digital low-pass filter.

For example, in order to obtain a third-order filter, an output from the circuit shown in FIG. 8 is supplied to the circuit shown in FIG. 9. In other words, the first- and second-order filter operations are successively performed as follows:

$$Y_1 = Y_0$$

$$Y_0 = G_1 \cdot X + K_1 \cdot Y_1$$

$$Z_2 = Z_1$$

$$Z_1 = Z_0$$

$$Z_0 = G_2 \cdot Y_0 + K_2 \cdot Z_1 + L_2 \cdot Z_2$$

The output $Z_0$ is thus obtained from the third-order digital filter.

The standard values of the respective coefficients Q, A and B in the Bessel filter are given below:

For the second-order filter:

$$Q = 0.5774 \text{ and } A = 1.732$$

For the third-order filter:

$$Q = 0.6911, A = 2.542 \text{ and } B = 2.322$$

For the fourth-order filter:

$$Q_1 = 0.5219, A_1 = 3.023, Q_2 = 0.8055 \text{ and } A_2 = 3.389$$

When the values of the coefficients Q, A and B (especially the value of coefficient Q) are changed, a filter which does not overshoot in response to the step input can be obtained.

Figure 10:
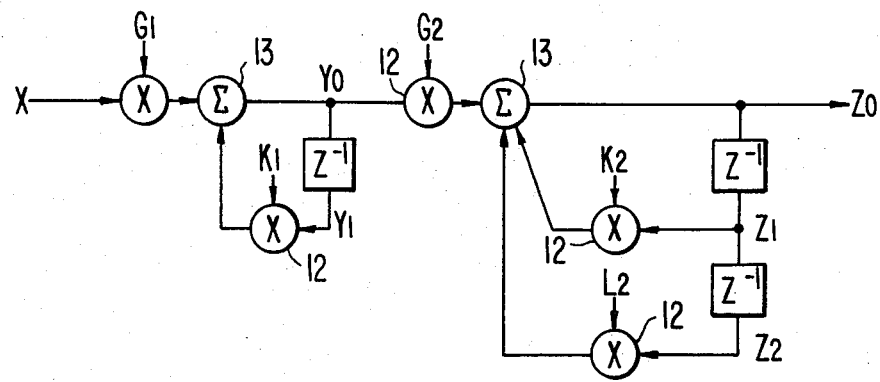
FIG. 10 is a block diagram of a third-order digital filter.

Another embodiment will be described wherein the low-pass filter 4 is coupled to the output of the linear acceleration/deceleration section 3 shown in FIG. 4. The linear acceleration/deceleration control shown in FIG. 6 is performed, and a resultant output is processed by the three-order low-pass filter shown in FIG. 10 under the control of a microprocessor or the like. This operation will be described with reference to a flow chart shown in FIG. 11.

Figure 11:
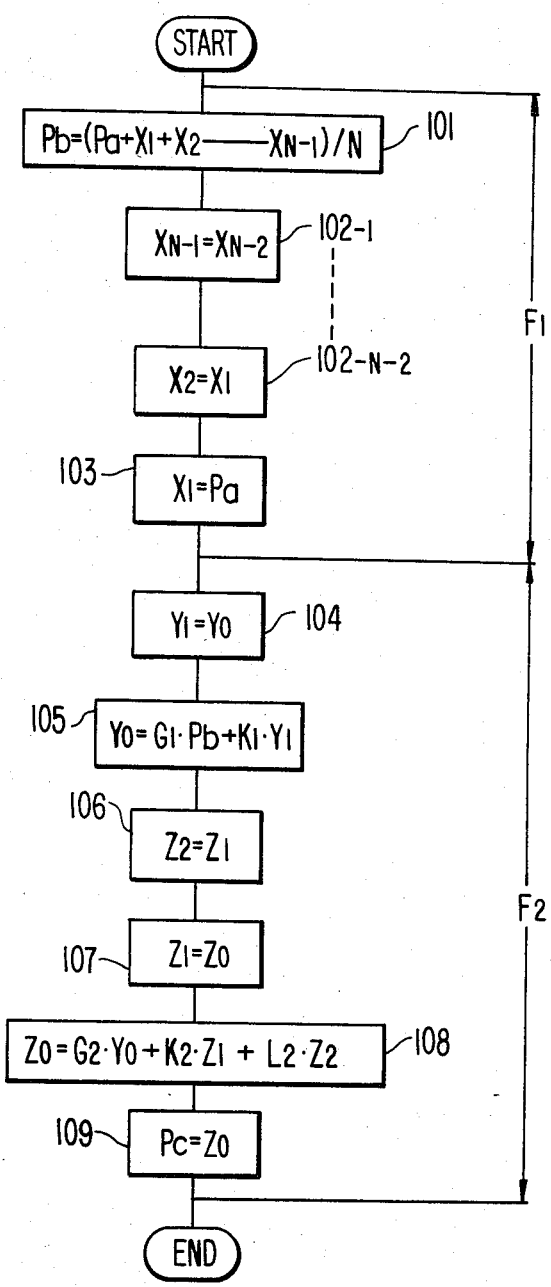
FIG. 11 is a flow chart for explaining the operation of the present invention when the third-order digital filter is coupled to the linear acceleration/deceleration control section.

The coefficients Q, A and B of the Bessel third-order filter, the cutoff frequency $f_0$ of this filter, the sampling period T and the time interval for which acceleration/deceleration is started and continues until a preset value is obtained are preset to obtain the respective coefficients $K_1$, $G_1$, $K_2$, $L_2$, $G_2$ and n ($=\tau/T$). The obtained values are entered in a microprocessor for controlling a robot or a machine tool (the respective coefficients $K_1$, $G_1$, $K_2$, $L_2$ and $G_2$ may be calculated by the microprocessor). The processing shown in FIG. 11 is performed for every sampling period T.

Figure 6:
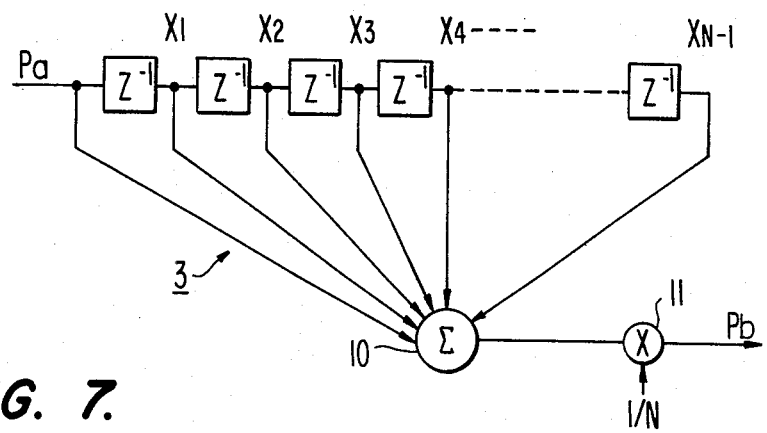
FIG. 6 is a block diagram of a linear acceleration/deceleration control system.

When the position instruction Pa for each axis which is calculated by an interpolating means is supplied to the linear acceleration/deceleration section 3 for every sampling period T, the operation shown in FIG. 6 and given by equation (5) is performed. More specifically, the input value Pa and each of the delayed values $X_1$ to $X_{n-1}$ stored in the memory are added. The resultant sum is divided by n. The obtained value Pb is then stored in the memory (step 101). At the same time, the memory contents for the values $X_1$ to $X_{n-1}$ are shifted (steps 102-1 to 102-N-2) in such a manner that the value of $X_{n-2}$ is stored in a memory area for $X_{n-1}$ (step 102-1), the value of $X_{n-3}$ is stored in a memory area for $X_{n-2}$ (step 102-2), ... the value of $X_1$ is stored in a memory area for $X_2$ (step 102-N-2), and the input Pa is stored in a memory area for $X_1$ (step 103). This processing is the linear acceleration/deceleration processing $F_1$.

The third-order low-pass filter processing $F_2$ is then performed. Stored data from the memory area for $Y_0$ is shifted to the memory area for $Y_1$ (step 104). By using the value Pb obtained by the linear acceleration/deceleration processing $F_1$ and the value $Y_1$, the following operation is performed:

$$Y_0 = G_1 Pb + K_1 Y_1$$

The resultant vlaue of $Y_0$ is stored in the memory (step 105). The values stored in the memory areas for $Z_2$ and $Z_1$ are updated to the values stored in the memory areas for $Z_1$ and $Z_0$ (steps 106 and 107). The following step is executed, and the resultant value of $Z_0$ is stored (step 108).

$$Z_0 = G_2 Y_0 + K_2 Z_1 + L_2 Z_2$$

The value stored in the memory area for $Z_0$ is generated as Pc (step 109).

When the processing $F_1$ and the processing $F_2$ are executed for every timing period T, the output Pb from the linear acceleration/deceleration section 3 in response to the input Pa is shown in FIG. 5(b), and the output Pc from the low-pass filter 4 is given as a smooth waveform signal, as shown in FIG. 5(c). The output Pc is supplied to the servo control section 6, high-speed acceleration/deceleration control can be performed without subjecting the servo control section 6, the servo motor M and the like to shock.

In the embodiment described with reference to the flow of FIG. 11, the processing $F_2$ of the low-pass filter is performed after the linear acceleration/deceleration processing according to the acceleration/deceleration system shown in FIG. 4. However, according to an acceleration/deceleration system having the acceleration/deceleration section consisting of only a low-pass filter, only the processing $F_2$ of FIG. 11 can be executed. In this case, Pb=Pa is established.

According to the present invention as described above, the high-frequency component of a of a positional command is cut off by the higher-order low-pass filter, and a fast response time can be obtained. Therefore, the servo control system and its load system will not be subjected to shock, and precise control can be performed.

I claim:

1. An acceleration/deceleration control system for a servo motor, comprising:
   acceleration/deceleration control means for receiving servo motor positioning instruction pulses, for providing at least second order low pass filtering of said instruction pulses, and for providing a filter signal responsive to said low pass filtered instruction pulses; and
   servo control means for receiving said filter signal from said acceleration/deceleration means and for controlling the servo motor in accordance with said filter signal so as to prevent abrubpt changed in the speed of the servo motor and resultant mechanical vibrations of the servo motor.

2. A system according to claim 1, characterized in that said low-pass filter comprises a Bessel filter.

3. An acceleration/deceleration control system for a servo motor, comprising:
   linear acceleration/deceleration control means for receiving servo motor positioning instruction pulses and for generating an output signal responsive to said instruction pulses and having a linearly increasing leading edge and a linearly decreasing trailing edge and including high frequency components; and
   low pass filter means for receiving said output signal, for providing at least second order high frequency filtering of said output signal to eliminate said high frequency components applying the low pass filtered output signal to the servo motor so as to prevent abrupt changes in the speed of the servo motor and resultant mechanical vibrations.

4. A system according to claim 3, wherein said low-pass filter comprises a Bessel filter.

5. An acceleration/deceleration control system for a servo motor comprising:
   receiving means for receiving servo motor positioning instruction pulses;
   linear acceleration/deceleration means, operatively connected to said receiving means, for linearly accelerating/decelerating said instruction pulses;
   low pass filter means, operatively connected to said acceleration/decelerated means, for filtering said accelerated/decelerated pulses and for driving the servo motor with said filtered accelerated/decelerated pulses, said low pass filter means being at least second order.

6. An acceleration/deceleration control system according to claim 5, wherein said low pass filter means comprises one of a Bessel filter, a Butterworth filter and a Chebyshev filter.

7. An acceleration/deceleration control system for a servo motor comprising:
   receiving means for receiving servo motor positioning instruction pulses;
   linear acceleration/deceleration means including first order digital filter means for linearly accelerating/decelerating said instruction pulses; and
   low pass filter means including second order digital filter means, operatively connected in series with said first order digital filter means, for filtering said accelerated/decelerated pulses and for driving the servo motor with said filtered accelerated/decelerated pulses.

* * * * *